May 16, 1933.  O. GARRISON  1,909,398

GEAR GRINDER AND THE LIKE

Filed June 5, 1930    10 Sheets-Sheet 1

INVENTOR
ORLANDO GARRISON, DEC'D.
BY ANNA M. GARRISON, ADMX.

BY Joseph K. Schofield
ATTORNEY

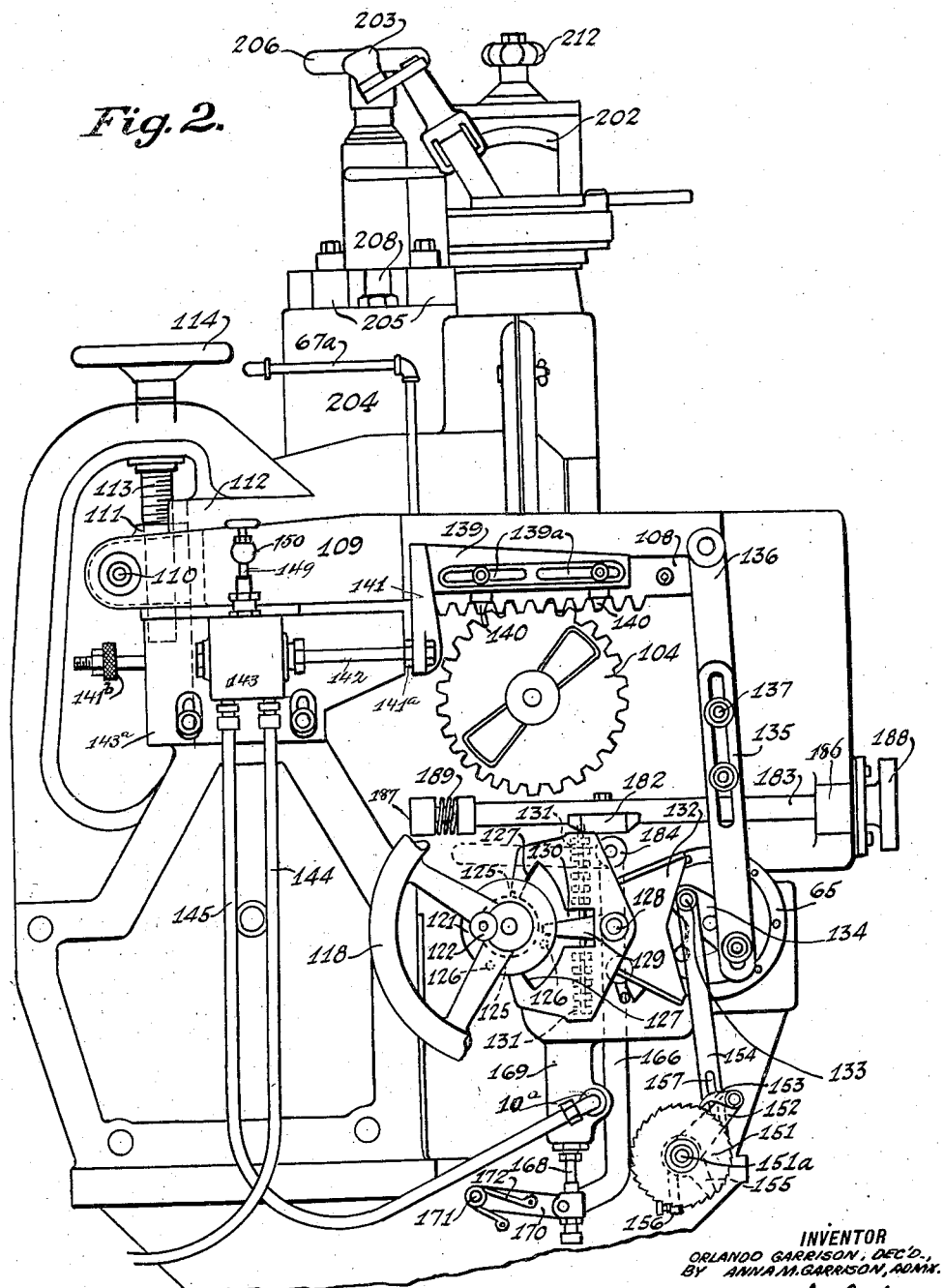

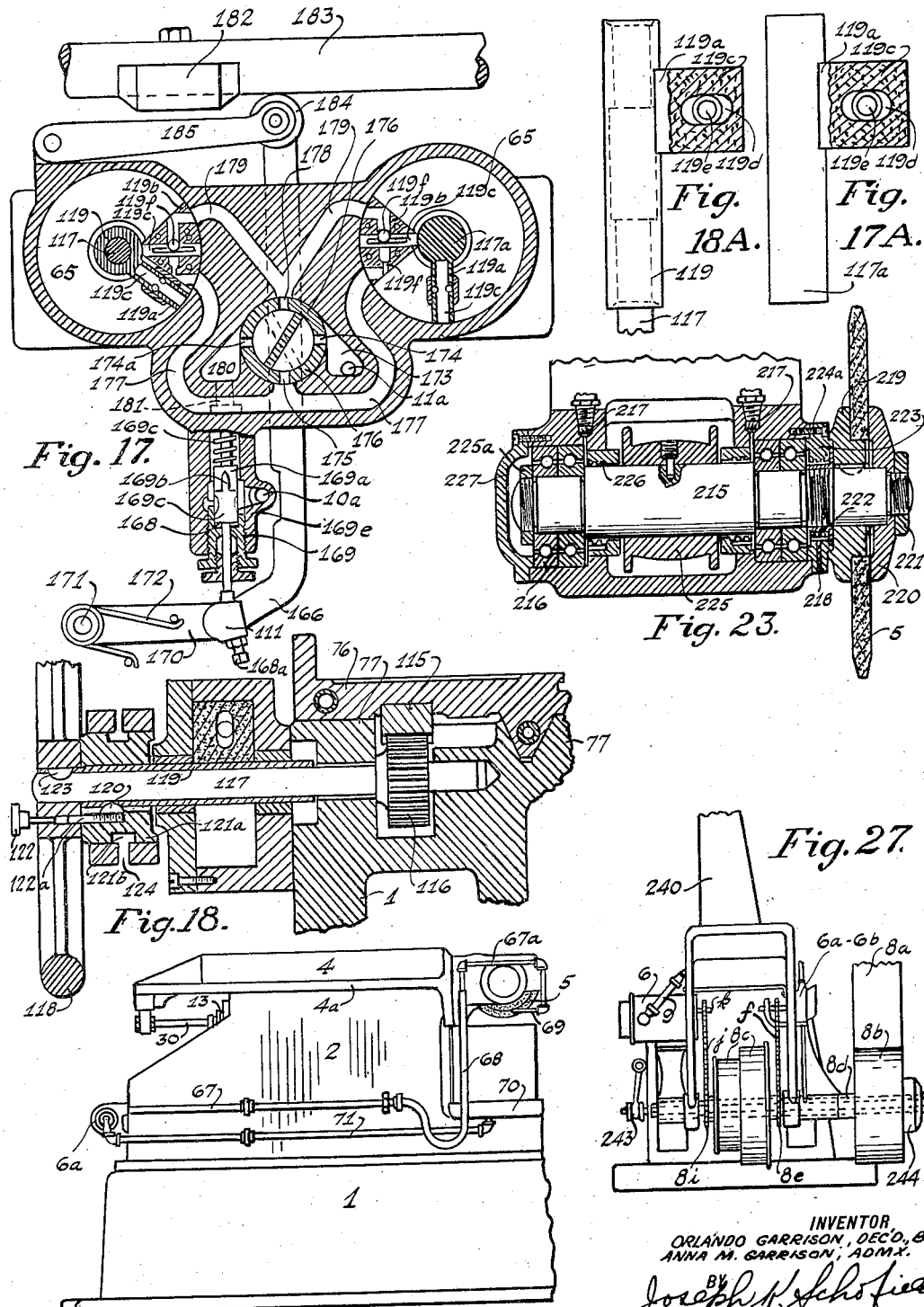

May 16, 1933.   O. GARRISON   1,909,398
GEAR GRINDER AND THE LIKE
Filed June 5, 1930   10 Sheets-Sheet 4
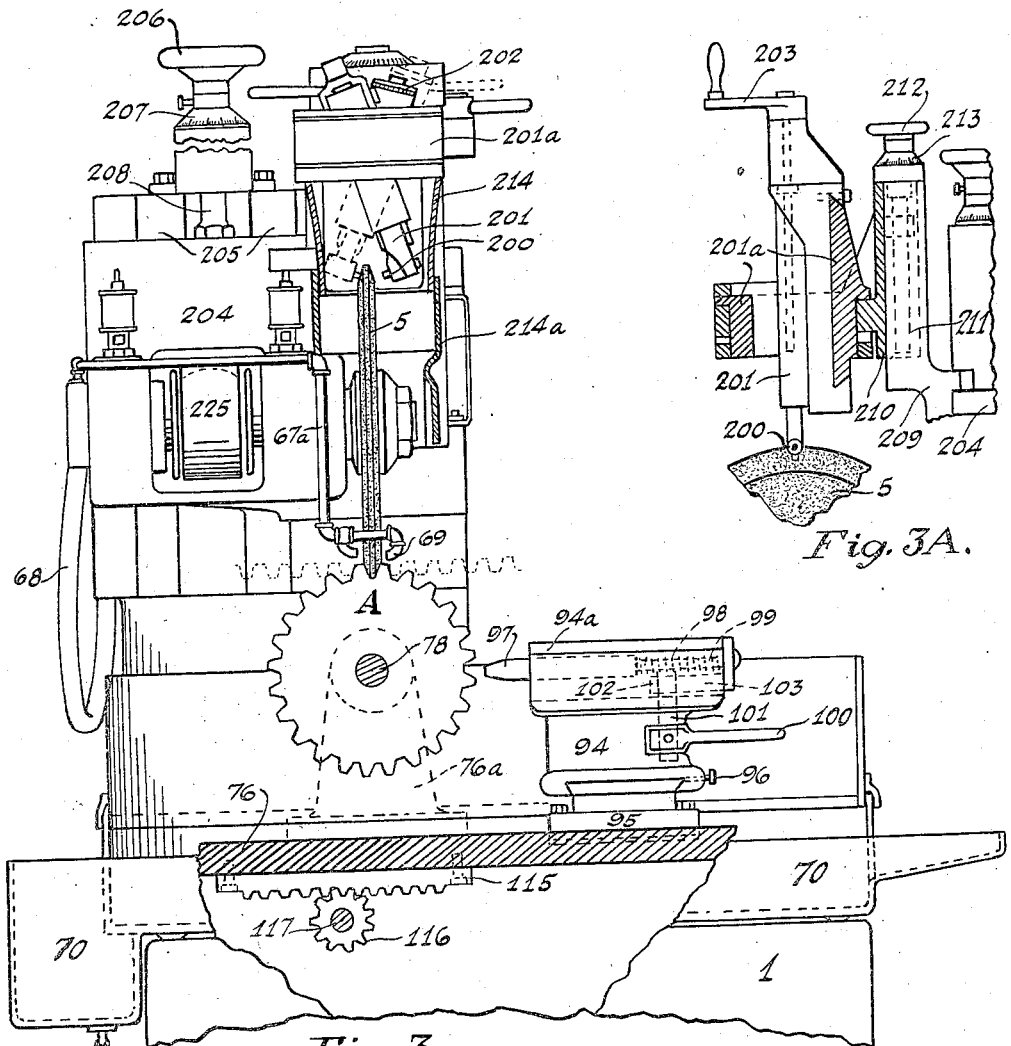
Fig. 3.
Fig. 3A.
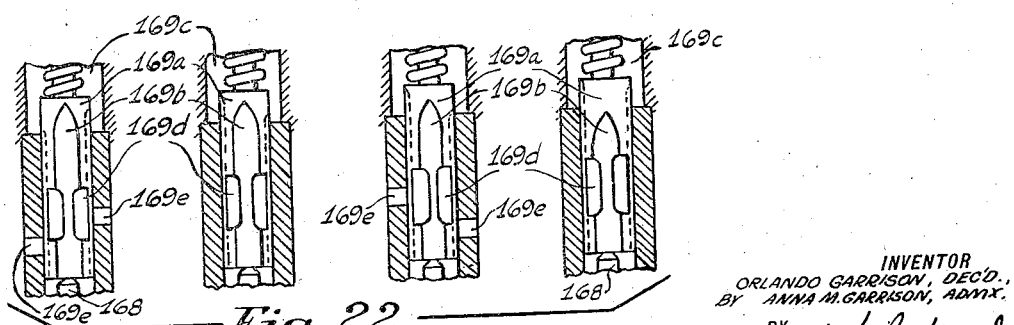
Fig. 22.
INVENTOR
ORLANDO GARRISON, DEC'D.,
BY ANNA M. GARRISON, ADM'X.
ATTORNEY

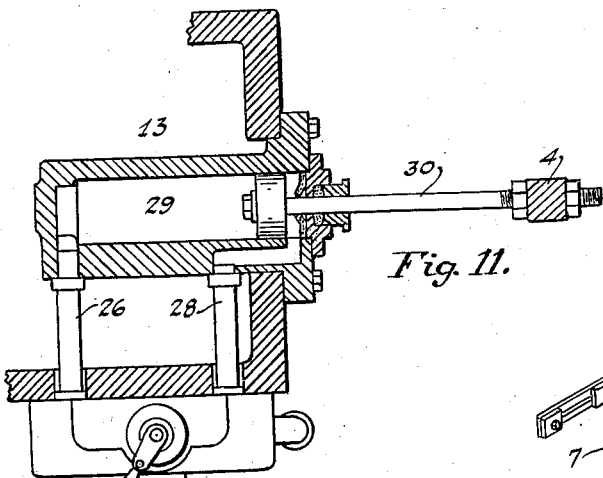
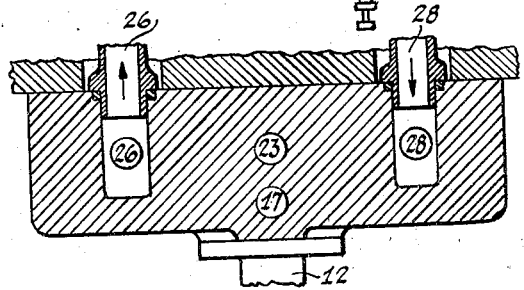
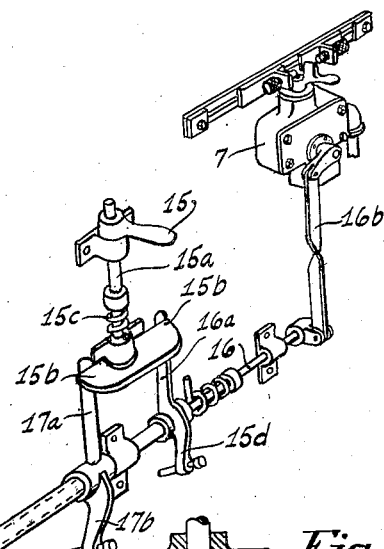
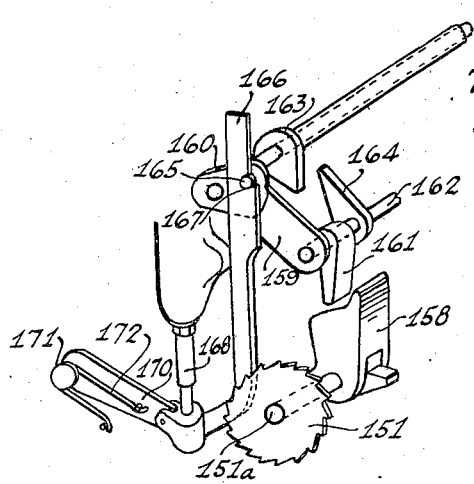
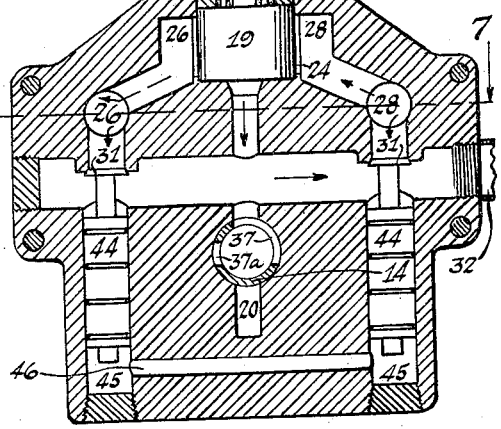

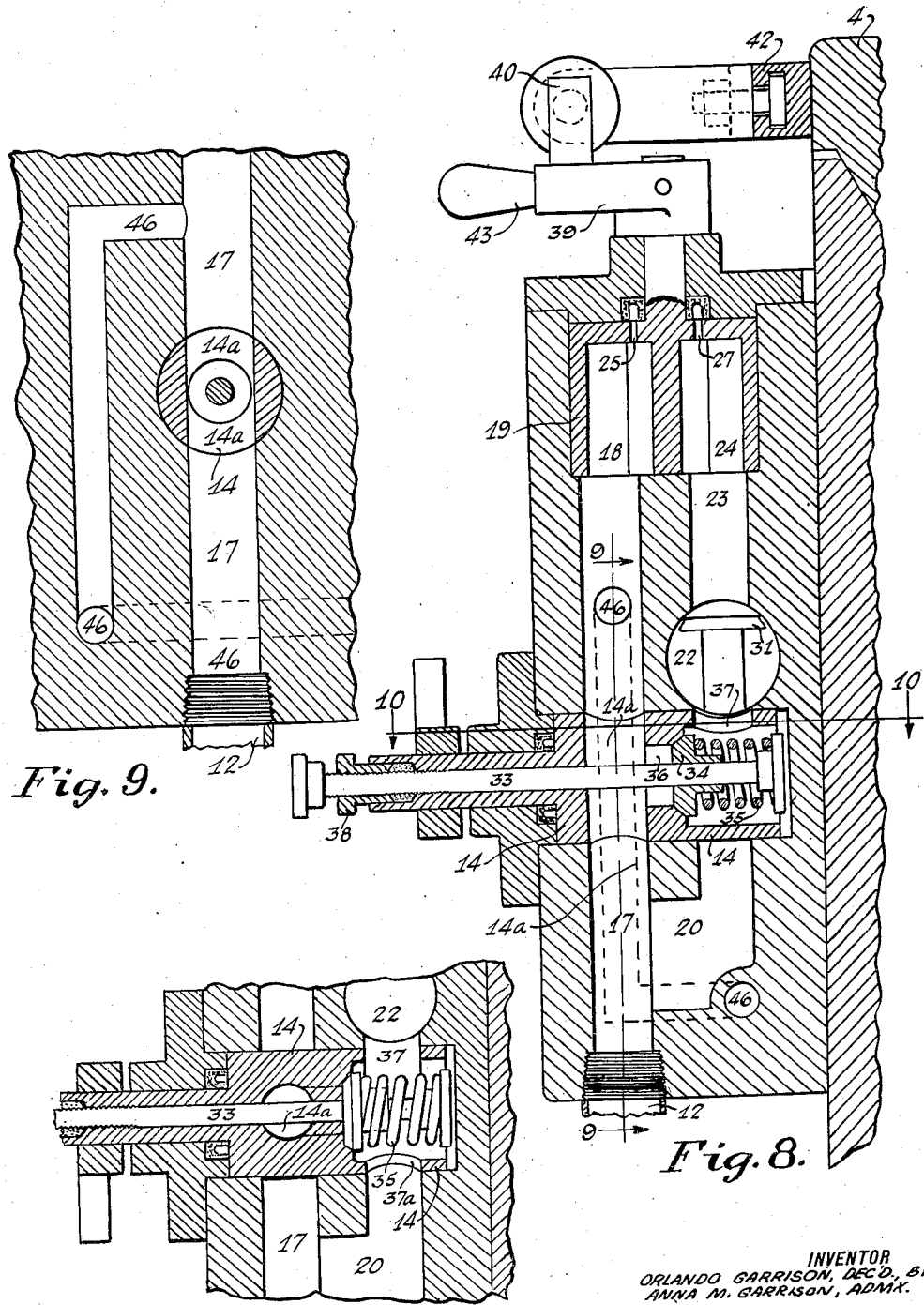

May 16, 1933. O. GARRISON 1,909,398
GEAR GRINDER AND THE LIKE
Filed June 5, 1930 10 Sheets-Sheet 8

INVENTOR
ORLANDO GARRISON, DEC'D.,
BY ANNA M. GARRISON, ADMX.
BY Joseph K. Schofield
ATTORNEY

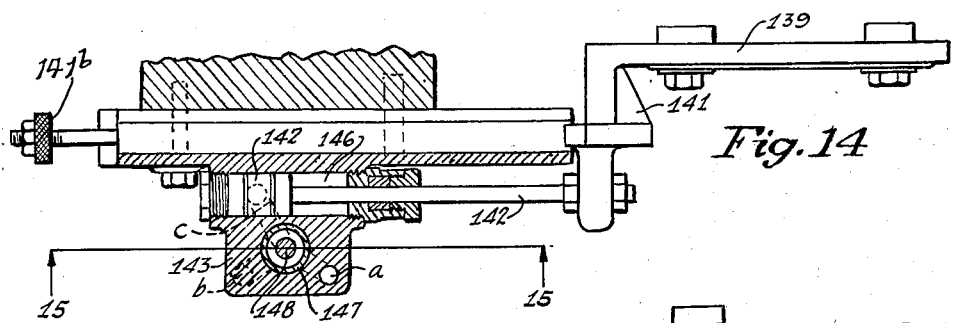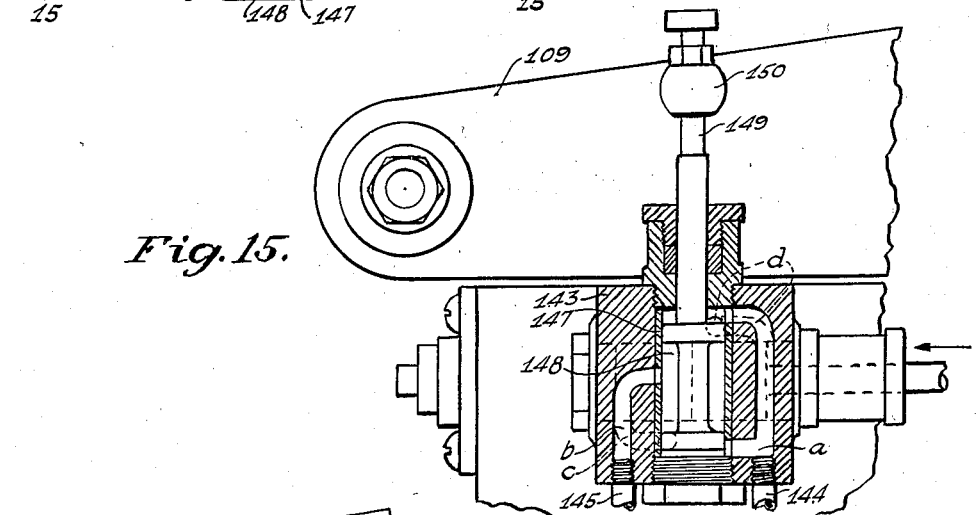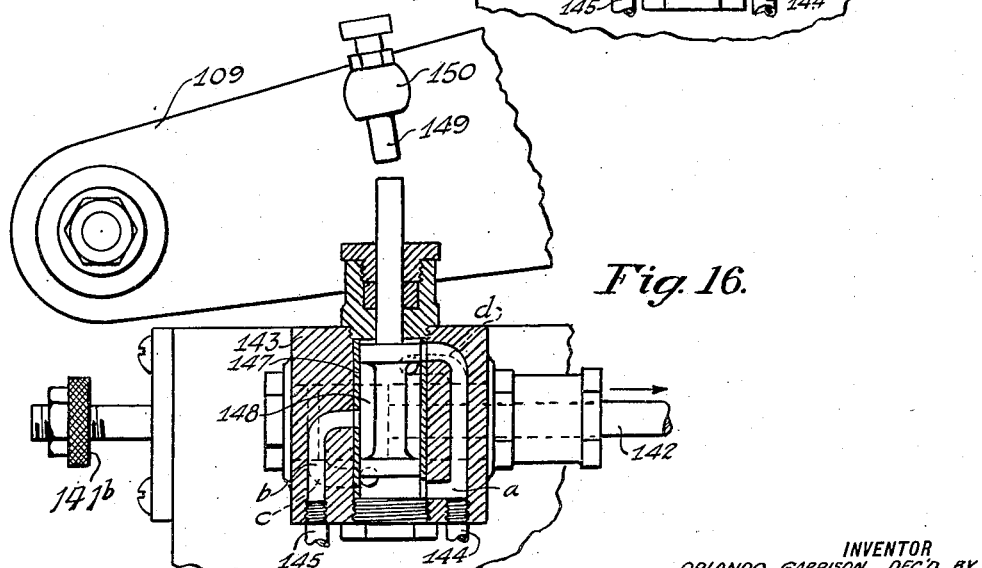

May 16, 1933.  O. GARRISON  1,909,398
GEAR GRINDER AND THE LIKE
Filed June 5, 1930.  10 Sheets-Sheet 10

INVENTOR
ORLANDO GARRISON, DEC'D. BY
ANNA M. GARRISON, ADMX.
BY
Joseph K. Schofield
ATTORNEY Patented May 16, 1933

1,909,398

UNITED STATES PATENT OFFICE

ORLANDO GARRISON, DECEASED, LATE OF DAYTON, OHIO, BY ANNA M. GARRISON, ADMINISTRATRIX, OF DAYTON, OHIO, ASSIGNOR TO PRATT & WHITNEY COMPANY, OF HARTFORD, CONNECTICUT, A CORPORATION OF NEW JERSEY

GEAR GRINDER AND THE LIKE

Application filed June 5, 1930. Serial No. 459,275.

This invention relates to improvements in gear grinders, having particular reference to machines of the character set forth in Patent No. 1,469,504, issued to said Orlando Garrison October 2, 1923, and in Patent No. 1,823,734 granted said Garrison, September 15, 1931.

In this type of gear grinder the gear teeth are generated in the process of grinding by a suitable abrasive wheel which sustains the same relation to the gears as a master rack sustains to a master gear when operating one with the other. It follows, therefore, that a gear grinder constructed on this principle will be accurate in grinding in the same degree that mechanical accuracy is attained in the construction of the machine.

It follows also that the gear teeth will be generated by passing through operating relation with the grinding wheel, a gear being ground in one setting up on the machine, which prevents sources of errors in grinding common to machines on which gears being ground must be set up twice for complete grinding, first for grinding the faces of the gear teeth on one side, and again for grinding the teeth on the opposite side. Inaccuracies occur due to the impossibility of setting up the gears for the second operation in exact conformity with the setting up for the first operation.

A further gain in accuracy of grinding is attained in the improved gear grinder herein set forth by the cross-sectional, rack-tooth shape of the grinder wheel, which enables the use of a thicker wheel which has less lateral deflection under the grinding pressure. The grinder wheel engages the gear teeth in successive cuts while the gear is rolling past the wheel, traversing the gear teeth reciprocally in a plane parallel to the axis of the gear. The grinding wheel passes through the space between adjacent teeth concurrently with the reciprocable grinding action and a plurality of times during each rolling movement. The grinding wheel, through the entire grinding operation, has narrow face contact and exerts relatively light lateral pressure on the gear teeth. Accordingly, there is no material deflection of the wheel, which contributes to the accuracy of grinding attained on the machine. Also, in production grinding of commercial gears, a relatively greater output is obtained, as rejections due to inaccuracies of the product are minimized.

An outstanding improvement of the gear grinder as herein set forth consists in hydraulic controls for certain of the mechanism which act to minimize vibrations of the machine and to effect smoothness of operation, which are factors contributing materially to the high degree of accuracy attained, low maintenance cost, and durability and reliability, which are characteristic of the improved grinder.

For presenting the complete structure and operation of the present form of improved gear grinder, the mechanism for dressing the grinder wheel is included, being substantially identical, as herein shown, with the wheel dresser set forth in Patent No. 1,573,153, issued to Orlando Garrison February 16, 1926.

The improvements of the gear grinder as herein set forth consist more especially in the construction and operation of hydraulic mechanism and mechanisms operably associated therewith. Other improvements consist in driving connections for direct electric motor operation which has the effect of making the machine into an independent operating unit.

In the accompanying drawings which serve for illustrating the invention:

Fig. 2 is a detail view of the grinder in front elevation;

Fig. 2A is a rear side elevation of the grinder;

Fig. 3 is a sectional view on the plane of line 3—3 of Fig. 1;

Fig. 3A is a detail side elevation partly in section of the wheel dressing mechanism shown in Fig. 3;

Fig. 6 is a vertical sectional view taken on the plane of line 6—6 of Fig. 5;

Fig. 7 is a horizontal sectional view taken on the plane of line 7—7 of Fig. 6;

Fig. 8 is a vertical sectional view taken on the plane of line 8—8 of Fig. 5;

Fig. 9 is a vertical sectional view taken on the plane of line 9—9 of Fig. 8;

Fig. 10 is a horizontal sectional view taken on the plane of line 10—10 of Fig. 8;

Fig. 11 is a vertical sectional view through the motor for reciprocating the wheel carrying ram;

Fig. 14 is a horizontal view in section of the motor for operating the indexing mechanism;

Figs. 15 and 16 are vertical sectional views taken on the plane of line 15—15 of Fig. 14 showing the valve for the indexing motor in different positions;

Fig. 17 is a vertical sectional view of the hydraulic motors for operating the work carriage traversing mechanism;

Fig. 18 is a vertical sectional view taken at right angles to Fig. 17 through one of the motors;

Figs. 17A and 18A are detail views of parts of the motors shown in Fig. 17;

Fig. 21 is a general view in perspective of the mechanism for controlling the starting and stopping of the grinder;

Figures 24, 26:
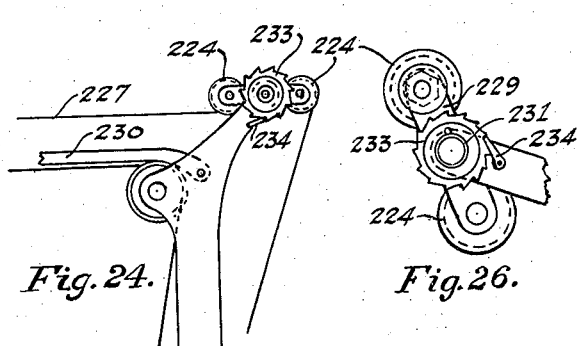
Figure 25:
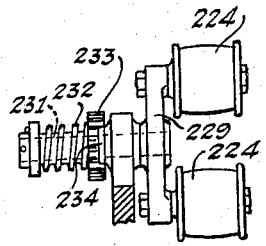

Fig. 22 consists of four sectional views showing different operative positions of the valve mechanism for controlling operation of certain of the hydraulic motors;

Fig. 23 is a sectional view of the grinder wheel spindle;

Figs. 24 to 27 inclusive are detail views of the driving connections for the machine from the power motor.

In the above mentioned drawings is shown an embodiment of the invention which is now deemed preferable, but it is to be understood that changes and modifications may be made within the scope of the appended claims without departing from the spirit of the invention.

As here shown, a bed base 1 supports the machine base 2 of the gear grinder. A ram 4 supporting the grinder wheel 5 operates on ways 4a of base 2.

Figure 1:
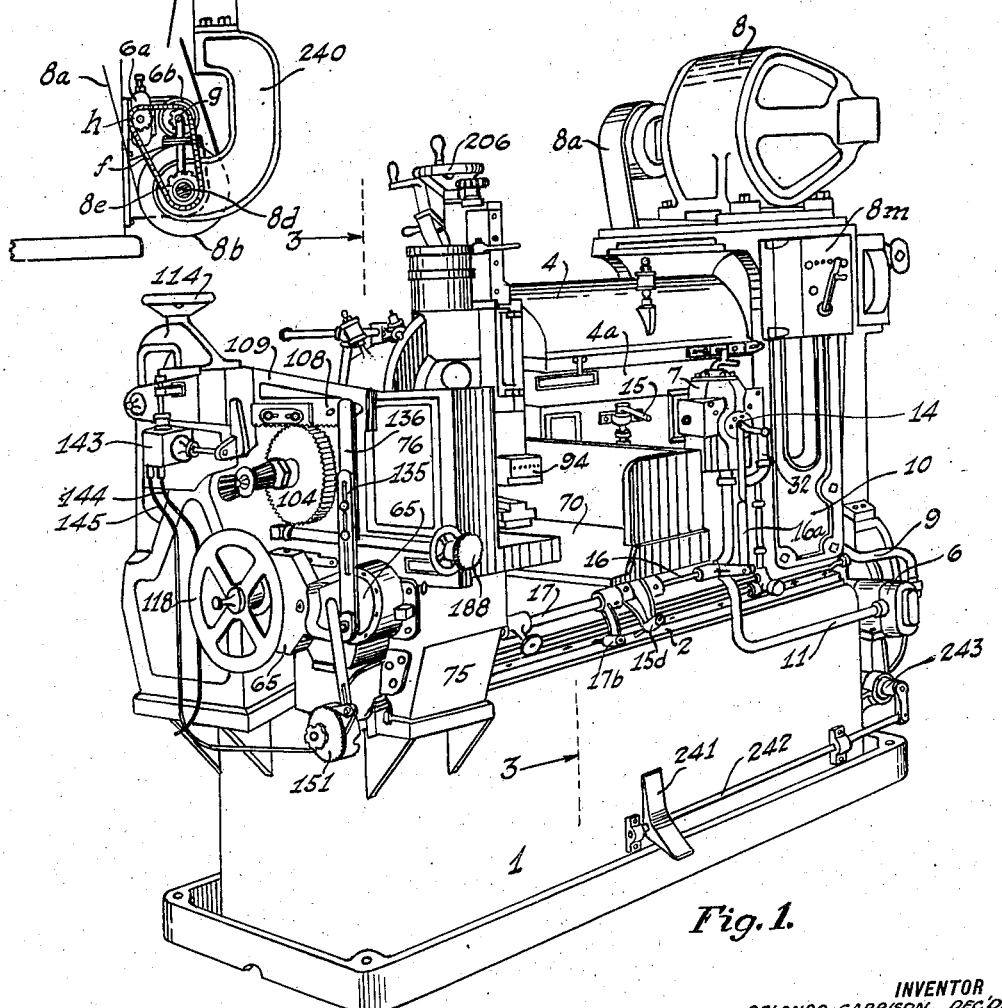
Figure 1 is a general view in prespective of the complete improved gear grinder.
Figure 4:
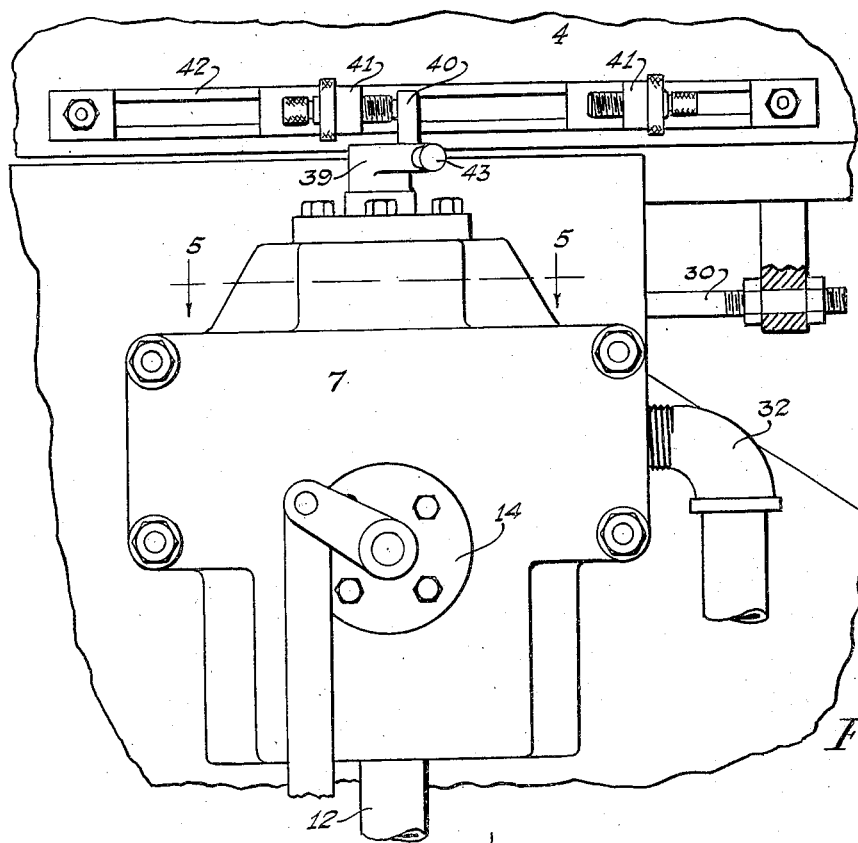
Fig. 4 is a view in side elevation of part of the hydraulic mechanism for operating the wheel reciprocating ram.
Figure 5:
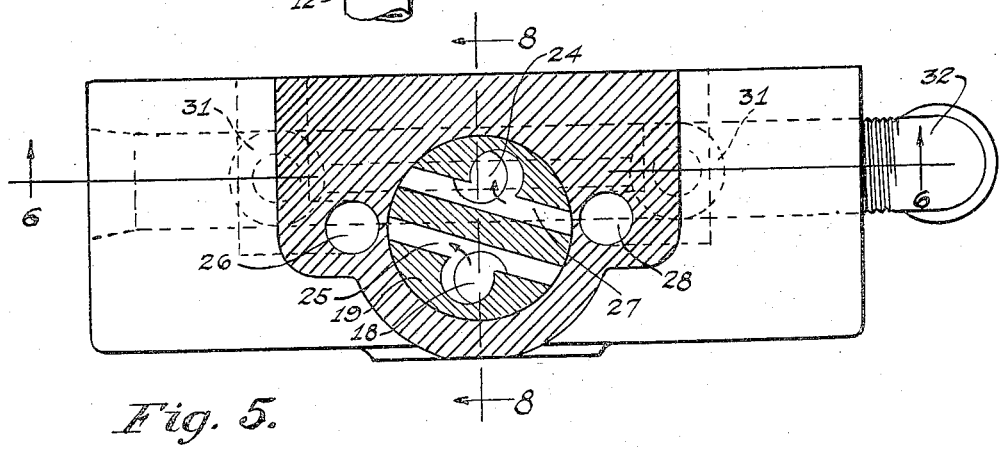
Fig. 5 is a horizontal sectional view taken on the plane of line 5—5 of Fig. 4.

The ram is operated by a hydraulic pump 6 and hydraulic motor 7—13 (Figs. 1, 4 and 11), the operating power being from an electric motor 8, operably controlled by a switch 8m, the motor 8 being connected to the pump by belt 8a, pulleys 8b—8c and shaft 8d (Figs. 24—27). The pump 6 is connected by a pipe 9 to a reservoir or sump 10 in base 2 for a suitable liquid, such as oil, for hydraulic operation. From pump 6 the liquid passes through pipe 11 and valve 14 to the motor 7—13. The valve 14 is manually operable, for starting and stopping the machine, by a lever 15 connected to the valve by a shaft 15a, arms 15b on shaft 15a, shaft 16, arm 16a on shaft 16 and a link 16b connecting the shaft to the valve (Fig. 21).

Details of the ram motor 7—13 are shown in Figs. 4—11 inclusive and will now be explained. The liquid enters the valve housing, as best shown in Fig. 8, through pipe 12, passes upward, when valve 14 is open, through a passage 17 into chamber 18 of valve 19, thence through passages 25—26 to the left end of cylinder 29, as viewed in Fig. 11, the discharge of the liquid from the opposite end of the cylinder, as piston 30 moves in that direction, being through passages 28—27—24 and 23, drain chamber 22 and pipe 32 to reservoir 10 (Fig. 6).

The alternate movement of the liquid on the reverse movement of the piston, is through chamber 18 and passages 25—28 to the opposite end of cylinder 29, the discharge from the cylinder being through passages 26—27—24—23, chamber 22 and pipe 32 to reservoir 10. Valve 14 is full open to oil passage 17 when the machine is operating, and closed when the machine is at rest.

Valve 14, as best shown in Fig. 8, includes a by-pass or relief valve comprising stem 33, seat 34, spring 35 and ports 36—37—37a (Fig. 10). The stem 33 is adjusted at its outer end by a nut 38 in the stem of valve 14, this adjustment serving for regulating the tension of a spring 35 acting against the valve 34a to hold it against its seat and controlling the operating pressure of motor 7—13. When the oil pressure in passage 17 exceeds the limit of normal operating condition, springs 35 yields and the oil escapes through ports 36—37 directly into the drain connections 22—32 without passing into the motor cylinder 29, thus restoring the pressure to normal.

When the machine is stopped and valve 14 is closed to passage 17, ports 37—37a are open to the drain chamber 22, as shown in Fig. 10, which permits the oil from pressure line 12 to flow through a passage 20 and ports 37—37a into the drain 22—32 without building up the pressure in the passage 17. Operation of valve 19 is effected by arm 39—40 (Fig. 4) secured to the valve stem and engaged alternately by actuators 41 adjustable on a support 42 carried by the ram and adjusted in position according to the desired length of stroke of the ram. A finger piece 43 on arm 39 serves for manipulating the valve manually.

Cushioning valves 31 coacting with valves 14—19 (Figs. 6—8—9), are provided with stems 44 operable in wells 45 within the casing 7 which communicate one with the other and with the oil passage 17 by ducts 46, the closing pressure of the valves 31 being approximately the same as in cylinder 29.

When the direction of operation of piston 30 is reversed and the pressure in cylinder 29, at the end which is then discharging, increases the coacting valve 31 yields under pressure, the oil in well 45 acting to cushion stem 44 and to effect an easy action of the piston at the end of the stroke.

The hydraulic motors and the associated mechanisms serve for effecting smoothness of operation of the grinder, and to minimize operating vibrations and strains. This condition of the machine is an important factor which contributes materially to the accuracy of the work produced. The mechanisms necessarily require accurate manufacture and adjustments which are maintained in the operation of the machine by the simple regulating means associated with the hydraulic motors.

Associated with the hydraulic system, as shown in Fig. 2A, are a pump 6a, pipe line 67 including a section of flexible hose 68, pipe extension 67a on the ram, nozzle 69, catch pan 70, and return pipe 71 to the pump. These connections serve for discharging a continuous flow of cooling compound on the grinder wheel and on the gears being ground.

The mechanism for supporting the gears for grinding operations consists of a knee 75 on base 1 (Figs. 1—3—18) upon which the work carriage 76 operates on ways 77. The work arbor 78—78a (Figs. 19—20) is supported in head 76a in a roller sleeve bearing 79—79a, which has a threaded spindle or collet 80 and a collet 81 in its opposite ends. Sleeve 79 is adjustable in the bearing by a nut 79b on its inner end, and a spring tensioned washer 79c interposed between the nut and the adjoining bearing 79a.

Figure 19:
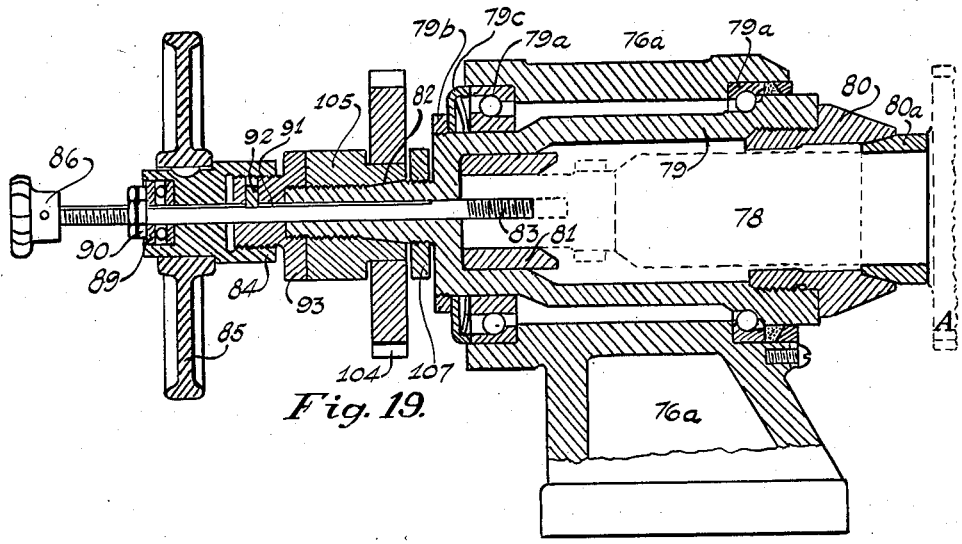
Figs. 19 and 20 are sectional views of two forms of work arbors.

The gears to be ground are held firmly in position by adjusting the arbors 78—78a axially, two modifications or constructions being shown. In Fig. 19 gear A to be ground is integral with arbor 78 and in Fig. 20 the work A comprises a plurality of gear units supported in axial alignment on arbor 78a. In both constructions spindle 79 has a rearwardly tapered sleeve 82 which serves for supporting draw bars 83—83a threaded into the inner end of arbor 78, and extending through arbor 78a respectively. A nut 84 having an adjusting handle 85 is connected to parts 83—83a adjacent their opposite ends. When the work is set up for grinding, as shown in Fig. 19, the gear is first aligned with a master gear, as will presently be described. Draw bar 83 is then threaded into arbor 78 and handle 85 is backed off for drawing the gear arbor 78 firmly into collets 80—81, the gear A being forced against a collet 80a, in the outer end of collet 80.

Figure 20:
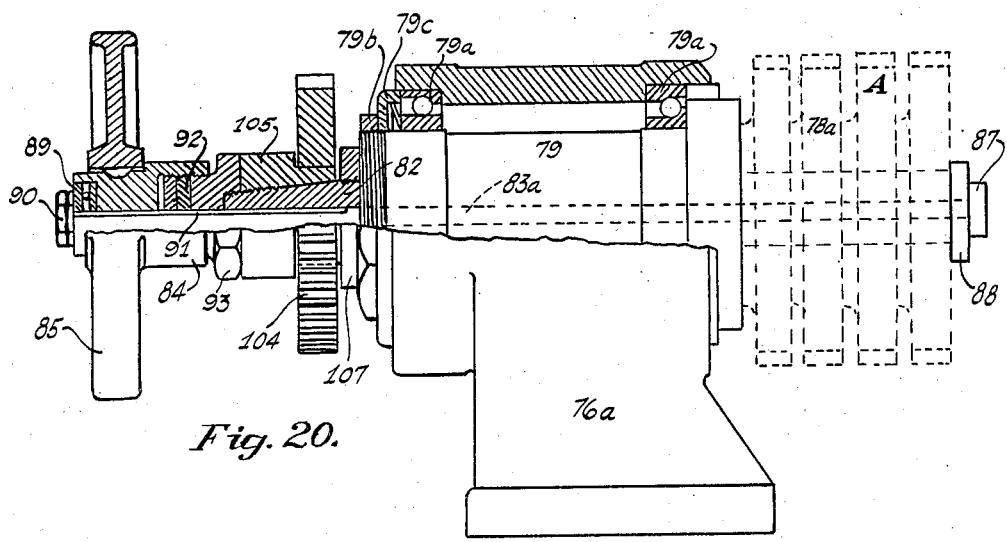

As shown in Fig. 20, the inner end of draw bar 83a has a head 87, a split washer 88 being interposed between the head and the first unit of gears A. To provide for adjustment of the draw bars 83 and 83a without friction in nuts 84, the same are fitted with bearings 89, lock nuts 90 serving to adjust the bars for length, and for engaging the bars when nuts 84 are backed off for tightening gears A on their arbor. Rotation of the draw bar in the latter adjustment is prevented by key 92 in nut 93 threaded on the work spindle and coacting with nut 84 and spline 91 in the bar.

The mechanism for aligning the gears A in their work arbors consists, as shown in Fig. 3, of a support 94 adjustable slidably parallelly to the work arbor on base 95. The base 95 being slidable on the work table 76 at right angles to the arbor 78. Set screws 96 hold the mechanism as adjusted. A plurality of independently projectable fingers 97 are supported in a slidable housing 94a in the upper portion of housing 94 for aligning the gears for grinding, the fingers being normally extended by compression springs 98 on stems 99 threaded into the fingers. The fingers 97 are retractable independently and individually by the stems 99 and are movable collectively relative to gears A by a lever 100 connected to stem 101, which has its upper end extended into recess 102 of housing 94a and connected with an eccentric disc 103. When lever 100 is operated, the disc 103 engages the adjacent walls of the recess and moves housing 94a and fingers 97 relative to gears A.

Figure 12:
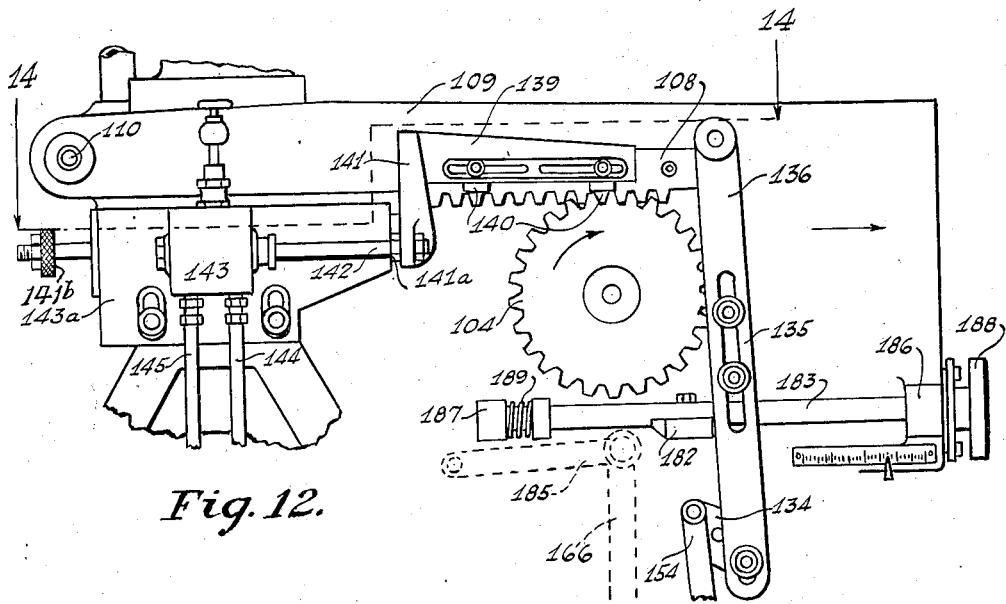
Figs. 12 and 13 are detail views in front elevation of the gear indexing mechanism.
Figure 13:
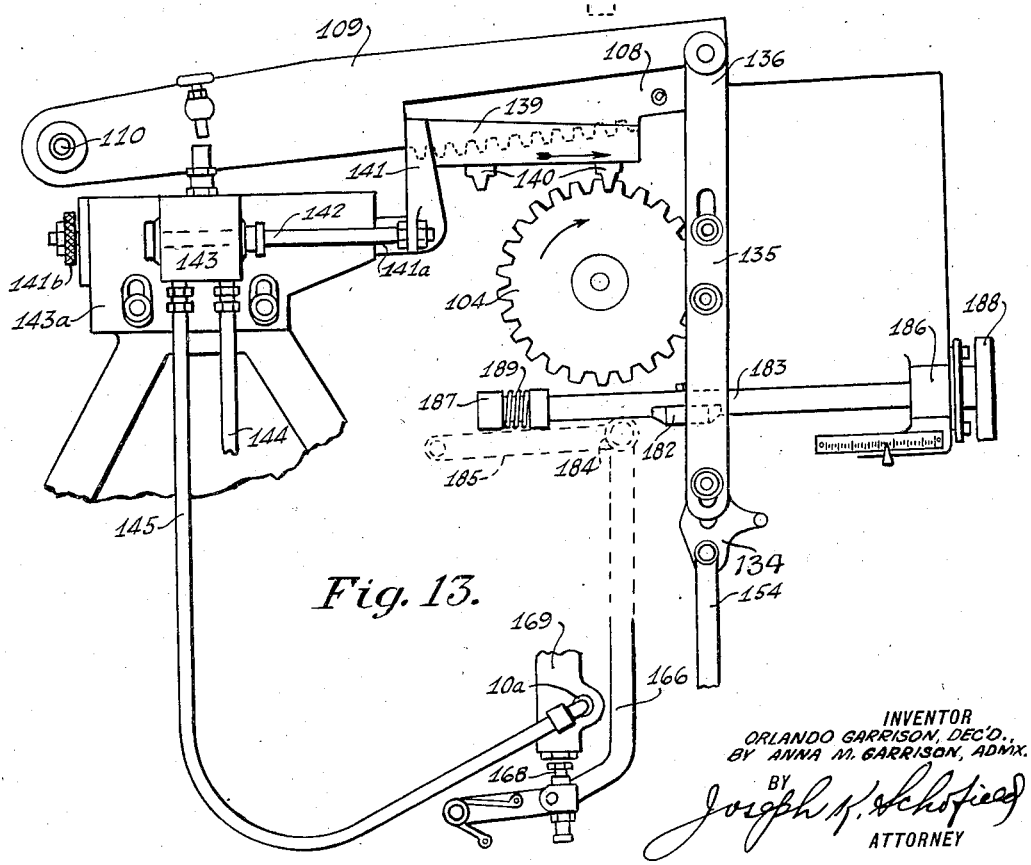

A master gear 104 is supported on the tapered end 82 of sleeve 79 by a spacing hub 105 and lock nut 93, a nut 107 for backing off the master gear being interposed between the gear and nut 79b. Operably associated with the master gear 104 is a master rack 108 which is supported, as shown in Figs. 12—13, on bifurcated arm 109 pivoted at 110 on bracket 111 which is adjustable vertically on bracket 112 by screw shaft 113 and hand wheel 114.

The work spindle 78 has three movements during the grinding operations, i. e., transverse movement with the work table 76, rotatable movement upon its own axis, these two movements effecting a rolling movement upon a pitch diameter, and finally, indexing movement upon its own axis at the ends of the movements of the work table 76 with master gear 104. The transverse movement is accomplished by rack 115 (Fig. 3) fixed on the work table of the machine upon the lower surface of the work table 76 and engaged by gear 116 on shaft 117, the shaft having a hand wheel 118 at its outer end which serves for moving the work table 76 manually at times for effecting adjustments of the machine.

Shaft 117 is operated by one of the hydraulic motors 65, a sectional view of which is shown in Fig. 17, the motor being supported, as shown in Fig. 18, on a sleeve 119 arranged telescopically on the shaft 117. The sleeve 119 is keyed at 120 to hub 121a connected to hand wheel 118 by pin 122a which is adapted to be released by pressing a plunger 122. The hand wheel 118 is keyed to shaft 117 at 123. The motor 65 and gear 116 normally operate in unison, the hand wheel 118 being disengaged from sleeve 119 and the motor 65 my movement of pin 122a for moving the work table 76 manually.

Supported on hub 121a on opposite sides of an annular groove 121b are two spaced rings 121 which are adjustable one relative to the other circumferentially. The rings are spaced one from the other to provide an annular groove 124 between the rings 121, and are further provided, as shown in Fig. 2, with pins 126 which extend into groove 124 from the opposite rings. Operable by rings 121 is a double pawl 127 which is pivoted at 128 and coacts alternately with notches 125 in the peripheries of the rings. Also pivoted at 128, and extended between parts 121, is a trip finger 129 which is engaged alternately by pins 126 for reversing the action of pawl 127. The pawl 127 has a clearance space 130 adjacent its pivot center into which oppositely disposed spring-tensioned pins 131 in the pawl are extended, normally retaining the pawl 127 in its central or neutral position.

As motor 65 operates and pins 126 alternately engage finger 129, both latching members of pawl 127 will be out of engagement with notches 125 until the work carriage reaches the limit of movement in one direction, then one of the notches 125, according to the direction of movement of the carriage, will register with pawl 127 which will act under pressure of the coacting spring 131 to engage the notch and stop the motor and work carriage. When the movement of the carriage is in the opposite direction the opposite notch 125 and pawl 127 will act in like manner to stop the motor 65 and carriage 76.

It will be apparent that the extent of travel of the work carriage 76 in either direction will be determined by rotary adjustment of rings 121, the travel of the carriage 76 being in exact proportion to the circumferential spacing of notches 125 and pins 126. Thus the movement of the carriage 76 can be regulated accurately according to the diameter of gears to be ground to completely grind the adjacent faces of adjacent teeth.

Formed integrally with pawl 127 is a wing-shaped cam 132 and coacting with the cam is a cam follower 133 supported on a pitman head 134 operably associated with the opposite or right hand motor 65. The follower 133 acts to disengage the pawl from rings 121 for reversing the work carriage. A divided link 135—136 adjustably connected to the pitman head 134 and arm 109 acts to move the master rack 108 into and out of engagement with the master gear 104. The link is adjustable as to length at 137 for connecting it variably with arm 109 to accommodate master gears 104 of different diameters.

The detail construction of motors 65 is best illustrated in Fig. 17, the motors being substantially identical as to construction and their operation inverse one from the other. Each motor 65 has a rotatable piston 119a coacting with a fixed wall 119b interposed between the motor shaft and the wall of the cylinder, the valves and also the fixed parts 119b being provided with flexible sealing devices 119c, such as rubber, best shown in detail Figs. 17A—18A, which are forced by the liquid under pressure within the motors into engagement with the motor shafts and walls of the cylinders for preventing leakage.

The detail assembly of the pistons 119a includes the oscillating shafts 117—119 to which the pistons are secured respectively. Each piston comprises a bifurcated radially disposed blade, between the opposite walls of which the expandable gasket or sealing element 119c is retained frictionally. Part 119c has an elongated opening 119d with which opposite check valves 119e in walls 119a communicate. When the operating liquid enters the cavity 119d from one or the other of the check valves 119e, according to the directions of operation of the pistons, the opposite valve 119e closes under the pressure of the liquid. The pressure of the liquid in the cavities of parts 119a causes the walls to expand into pressure engagement with the shafts and walls of the motors for preventing leakage of the operating fluid past the pistons. The sealing devices in parts 119b are provided with check valves 119f and respond in like manner to the oil pressure for preventing leakage in the motors.

The liquid is admitted to the motors from line 11a into a chamber 173 within the body member for the motors 65 and passes through ports 174—175 of valve 176, when the valve is in the position illustrated in Fig. 17, into a common supply passage 177 leading to both motors 65. When the valve 176 is in the inverse position the movement of the liquid is through ports 174—178 and a supply passage 179 leading to both motors. The exhaust from the motors is alternately through passages 177—179 to chamber 180 and port 181 to valve 169, thence to a return line 10a.

Valve 169 sustains an important relation to motors 65. When the starting lever 15 is moved to start the machine, arm 160 is moved out of engagement with link 166 (see Fig. 21), causing the link to be raised sufficiently by spring 172 for partially opening valve 169 and permitting the motors to start. When the machine is operating, valve 169 is acted upon variably by a cam 182 (Figs. 2—12—13) on an eccentrically adjustable shaft 183. As the work table 76 moves back and forth the cam engages a roller 184 on pivoted arm 185 connected with link 166, and acts to thrust the link 166 and valve stem 168 downward to an extent determined by adjustment of shaft 183, operation of the valve 169 acting to retard the motor by restricting the movement of the liquid through the valve, during the interval of actual grinding operations upon the teeth during each stroke of the table 76.

As the work moves out of engagement with the grinder wheel 5 by lateral movement of the table 76 in either direction cam 182 moves out of engagement with roller 184. As valve stem 168 rises under action of spring 172, the valve 169 is opened to greater extent, and the movement of the liquid through the motors 65 is accelerated which speeds up the work carriage 76 in the idle movements of the grinder wheel. The cam shaft 183 is adjustable in eccentric sleeves 186—187 by a knurled head 188 for variable grinding feeds according to the degree of finish desired on the gears. A tension spring 189 acts to retain the shaft 183 in adjusted position.

An enlargement of valve 169 is shown in four detail sectional views in Fig. 22. The valve stem 169a is connected with arm 170 (Fig. 2) and has a series of axially extended grooves 169b formed in its periphery, four grooves as here shown, of unequal lengths. The grooves communicate with an upper valve chamber 169c and an annular groove 169d in the valve stem which communicates with ports 169e leading to line 10a. As the valve 169 is actuated the flow of liquid through grooves 169b to groove 169d will be accelerated or retarded accordingly as the movement of stem 169a is up or down.

The adjustability of valve 169 and cam 182 provides a wide range of grinding feeds for regulating the action on the gear teeth being ground. When the cross feed is rapid, which results when valve 169 is open to a relatively greater extent, a wider surface on the gear teeth will be ground upon each stroke of the grinder wheel. As the valve 169 is more and more closed, correspondingly reduced surfaces are ground. This is accomplished by adjusting the valve stem downward until the longest groove 169b remains slightly open, which slows down the rolling movement of the gear to the lowest point of operation, the grinding in this adjustment being exceedingly fine and accurate.

The mechanism for indexing the master gear 104 and work A (Figs. 12—16) consists of a reciprocating rack 139 having two rack teeth 140 for alternately engaging the master gear, the teeth being adjustable one relative to the other by means of slots 139a, according to the diameter and number of teeth in the master gear. The rack is supported on arm 141 connected to a bar 141a slidable in the base housing 143a and on piston 142 of motor 143. This motor 143 is connected to pump 6b by pipe 144 and to line 10a by pipe 145. The stroke or operating range of the rack is adjustable by means of a threaded stem and nut 141b at the opposite end of bar 141a.

The detail construction of the motor is shown in Fig. 14 and includes a cylinder 146 in which piston 142 operates. The front portion of the housing is bored vertically for a valve cylinder 147 in which valve piston 148 operates. The stem of the piston is in operable relation with an actuator 149 adjustable in boss 150 on arm 109.

In the motor housing 143 a series of oil ducts a—b—c—d interconnect pipes 144—145 and cylinders 146—147. Duct a communicates between pipe 144 and the upper and lower ends of cylinder 147, duct b between pipe 145 and cylinder 147 intermediate the ends of piston 148, duct c between one end of cylinder 146, and the lower end of cylinder 147 at a point above the lower connection of duct a equal to the width of the piston heads, and duct d between the opposite end of cylinder 146 and the upper end of cylinder 147 at a point below the upper connection of duct a equal to the width of the piston heads.

The movement of the liquid through motor 143 is as follows: When the indexing mechanism is in the position illustrated in Figs. 12—15, the liquid from pipe 144 enters the lower end of cylinder 147 through duct a, thence, as arm 109 is moved upward and piston 148 is moved upward by the liquid, as illustrated in Fig. 16, the liquid flows into cylinder 146 through duct c, the discharge from the cylinder being through duct d, cylinder 147 and duct b to pipe 145. In the reverse operation, piston 148 is forced downward, as arm 109 moves downward, by actuator 149 to the position illustrated in Fig. 15, the movement of the liquid being from pipe 144, through duct a into the upper end of cylinder 147, thence through duct d into cylinder 146, the discharge from the cylinder being through duct c into cylinder 147 and duct b to pipe 145.

The width of the heads of piston 148 is substantially equal to the vertical distance between the centers of the ports of ducts a—c and a—d. In the upper limit of movement of the piston, the upper port of duct a will be fully closed and the ports of ducts c—d in cylinder 147 will be partially open, as shown in Fig. 16. In the reverse position, as shown in Fig. 15, the liquid will enter both ends of the cylinder through duct a, the action of the liquid on the greater area of the lower piston head being sufficient to overcome the resistance on the upper piston head for effecting the upward movement of the piston, as arm 109 is raised.

It will be noted that the ports of ducts c—d in the discharge of liquid from cylinder 146 to cylinder 147 are only partially open, thus the flow of the liquid is restricted which acts to resist the driving action of piston 142, the resistance of the liquid in the ends of cylinders 146—147 effecting a cushioning action on pistons 142—148 and minimizing the vibration of the indexing operation.

The indexing action is as follows: Assuming that the work carriage 76, in the relation of the parts illustrated in Fig. 12, is moving to the right and that the limit of movement of the work carriage and of the indexing action is reached in the relation of parts illustrated in Fig. 13; upon lowering of master rack 108 into operating relation with the master gear, the work carriage, upon reversing of motors 65, will move to the left, to the opposite limit of movement. Rack 139 will be retracted by motor 143 to the position shown in Fig. 12, and at the end of the movement the opposite rack tooth 140 will be in engagement with the master gear and will act upon operation of motor 143, as the master rack is again moved out of engagement with the master gear, to index the master gear 104 and the work spindle 79. Upon re-engagement of the master rack 108 and master gear 104 and movement of the work carriage 76 again to the right, rack 139 will again be retracted as the master gear 104 moves out of engagement with the rear tooth 140 and moves into the relation with the forward tooth 140 illustrated in Fig. 12.

One or the other of gear teeth 140 on rack 139 is in mesh with the master gear at the limit of each movement of the work carriage in opposite directions, thus acting to prevent movement of the master gear 104 by momentum when the master rack is disengaged from it. These teeth 140 serve to align the master gear 104, incidental to indexing of the gear, for reengagement with the master rack 108.

An indexing mechanism for stopping the machine upon completion of grinding operations on a gear is shown in Figs. 2–21, consisting of a ratchet 151, a pivoted arm 152, pawl 153, and link 154, which connects the arm to the pitman 134, a finger 155 of arm 152 engages stop 156 and limits the movement of the arm in the idle direction. A slot 157 in link 154 provides freedom of action at the connection with arm 152 at the limit of movement of the down stroke.

The function of the mechanism associated with ratchet 151 is to stop the movement of liquid to the motors 65 upon each revolution of the master gear 104 or upon complete operation of grinding a gear. To this end a trip pawl 158 (Fig. 21) on shaft 151a, upon which ratchet gear 151 is supported, acts upon each rotation of the ratchet gear 151 to release shaft 16, to which control lever 15 is connected, from its locked relation with arms 159—160, the mechanism being spring tensioned at 15c for reversing the movement of rod 15a upon releasing of shaft 16, for shutting off the liquid at valve 14. Arms 159—160 are released from their engaged relation one with the other by trip finger 161 supported on shaft 162 and actuated by pawl 158 when ratchet gear 151 completes a rotation.

Means for stopping the machine manually are also provided, consisting of lever 15 connected to tubular shaft 17 which is arranged telescopically on shaft 16, by shaft 15a and arms 15b—17a. A trip finger 163 on shaft 17 engages finger 164 on shaft 162 for releasing the interlocked arms 159—160, which results in reversing lever 15 and stopping the motors 65 and motor 13. Stops 15d—17b act to limit the movements of shafts 16—17 in one direction. Arm 160 has a pin 165 in its free end which engages shoulder 167 of bar 166 and acts, as arm 160 is operated, to move the bar and stem 168 of valve 169 downward which controls the operation of motors 65.

The wheel dresser mechanism, as herein stated, comprises the subject matter of Patent No. 1,573,153 and does not here require detail description. This mechanism is best shown in Figs. 3—3A, and consists of a carbon or diamond point dresser 200 mounted on an axially and pivotally adjustable bar 201, supported in a rotatable sleeve 201a, and providing for adjusting bar 201 axially and rotatably for moving the diamond points from one side to the other of the work edge of the grinder wheel for dressing the wheel to conform in cross section to the shape of a rack tooth of the desired angle. A scale 202 serves for making accurate angular adjustment of the dresser tool relative to the work edge of the grinder wheel, and crank 203 for operating bar 201 axially for moving the dresser point over the lateral work faces and peripheral edges of the grinder wheel.

The wheel dresser as a whole is mounted on the grinder wheel head 204 and moves with the ram 4 when the grinder is operating. The grinder wheel 5 is supported in the vertically adjustable wheel head 204 operable on ways 205 on the ram and is connected to the power motor 8 by pulley 225 and belt 227. The wheel head bracket is connected by a threaded shaft 208 to a hand adjusting wheel 206, a dial 207 serving for graduating the adjustments. Supported on the wheel head 204 is an intermediate bracket 209 upon which a vertically adjustable bracket 210 is supported, the latter being connected to a threaded shaft 211 provided with a hand wheel 212 for raising and lowering the bracket, a dial 213 serving for graduating the adjustments. The support 201a for dresser bar 201 is rotatable on bracket 210.

From the foregoing description it will be seen that the grinder wheel 5 is adjustable vertically to allow for grinding gears of different diameters and for wheels of different diameters, that the wheel dresser is adjustable to compensate for the reduced diameter of the wheel resulting from repeated dressings of its grinding edge, and that the dresser tool 201 is adjustable for dressing both side edges and the peripheral edge of the grinder wheel.

The grinder wheel head 204, as illustrated in Fig. 23, is designed for effecting extreme accuracy of alignment of the spindle 215 and for minimizing friction in the spindle bearings, the latter consisting in opposite ball bearings 216 at each end of the spindle. A feature of the bearings consists of oil filters 217 which act to exclude grit from the bearings, and oil drains 218 which act to remove any excessive oil and to prevent the formation of oil films which might effect the accuracy of alignment of the spindle. The grinder wheel is supported on a collar 219 which is keyed on the spindle and has a hub fitting the aperture of the wheel, which is held on the hub by disc 220, and a nut 221 threaded on the spindle. A sleeve 222, threaded on the spindle and operable in a ring bearing 223, secured on the bearing head by screws 224a, is butted against the adjacent bearings 216. A nut 225a threaded on the opposite end of the spindle against the opposite bearings 216 serves for adjusting the spindle axially. Sleeve bearings 226 support the spindle on opposite sides of the drive pulley 225. The wheel head structure as a whole conforms to standard practice for obtaining accuracy, smoothness of operation, and minimum wear.

The driving connection from power motor 8 to the grinder wheel consists of pulley 225 on the spindle of the wheel and belts 8a—227 (Fig. 24). Belt 227 is kept taut by an arm 240 pivoted on shaft 8d and connected to the ram by a link 230. Adjusted pulleys for the belt consist of two pulleys 224 supported on a rocker arm 229 on shaft 231 which is pivoted on arm 240 and is tensioned in clockwise direction by spring arm 232, being adapted to be adjusted in the opposite direction by a ratchet and pawl 233—234.

The operating connection from the power motor 8 to pumps 6a—6b (Figs. 24—27) is belt 8a, pulley 8b to shaft 8d, and chain and sprocket drive 8e—f—g—h; and from shaft 8d to motor 6, through chain and sprocket drive 8i—j—k. Clutch mechanism consisting of a foot lever 241 on shaft 242, shifter rod 243 extended through shaft 8d, and connected to friction disc 244 coacting with drive pulley 8b, serves for disconnecting the power motor from the machine.

What is claimed is:

1. A gear grinder including an arbor for supporting gears for grinding, a master gear operating with the arbor, and a master rack coacting intermittently with the master gear for moving the gears for grinding, and an auxiliary rack having teeth widely spaced one from the other axially of the rack, one of said teeth being in mesh with the master gear during intervals of inoperable relation between the master gear and master rack, and hydraulic means to actuate said auxiliary rack when said master rack is disengaged from said master gear for indexing the gears.

2. A gear grinder including an arbor for supporting a gear for grinding, a master gear operating with the arbor, and a master rack coacting intermittently with the master gear for moving the gears for grinding, and an auxiliary rack in register with the master rack when the master gear and master rack are in inoperable relation one with the other, and means to actuate said auxiliary rack for indexing the gears, said master rack and auxiliary rack being actuated alternately by hydraulic means in timed relation to each other.

3. A gear grinder including an arbor for supporting a gear for grinding, a master gear and a master rack operating with the arbor for moving said gear for grinding, a hydraulic motor for effecting movements of said gear, a grinder wheel having operating relation with the gears, an auxiliary rack operably associated with the master gear and master rack for indexing the gears for grinding, a hydraulic motor for actuating said auxiliary rack, and means to operate said auxiliary rack when said master rack has been moved to an inoperative position.

4. A gear grinder including a reciprocally operable carriage, an arbor thereon for supporting a gear for grinding, a master gear and master rack operating one with the other and said arbor and carriage for moving the gears for grinding, an abrasive wheel for grinding the gears having intermittent operating relation therewith, hydraulic means to move said rack into and out of inter-engagement with said master gear, and an auxiliary rack operable for indexing the gear being ground upon completion of reciprocable movement of said carriage.

5. A gear grinder including a hydraulic motor, an arbor for supporting a gear for grinding, a master gear and a master rack operating with the arbor for moving the gears for grinding, a rack operable with the master gear for indexing the gears for grinding, said motor including a cylinder and piston connected for moving said rack into and out of engagement with said master gear, and a valve operable by said master rack between intervals of grinding operation for directing the operating liquid to the motor.

6. A gear grinder including a hydraulic motor, an arbor for supporting a gear for grinding operation, a master gear operable with the arbor, a master rack intermittently operable with the master gear for effecting rolling motion of the gear for grinding, an auxiliary rack operably associated with the master gear and said motor for indexing the gears, and a valve operable by movement of said master rack between grinding intervals for directing the operating liquid to the motor.

7. A gear grinder including hydraulic motors, an arbor for supporting a gear for grinding, a master gear operable with the arbor, a master rack operable with the master gear for effecting rolling motion of the gear for grinding, an auxiliary rack operably associated with the master gear for indexing the gears, and individual hydraulic motors for moving said master rack and for effecting indexing movement of said auxiliary rack.

8. A gear grinder including a hydraulic motor, an arbor for supporting a gear for grinding, a master gear operable with the arbor, a master rack operable with the master gear for moving the gears for grinding, an auxiliary rack operably associated with the master gear and said motor for indexing the gear, a valve in the liquid line including inlet and outlet ports and a piston coacting with said ports for directing the operating liquid to and from said motor, and means to permit movement of said valve to advance said rack in indexing direction only when said master rack is disengaged from said master gear.

9. A gear grinder including a hydraulic motor, means for supporting a gear for grinding, a reciprocable ram for moving an abrasive wheel into grinding operation with the gear, said motor including a cylinder and piston operably connected to the ram, an oscillatory valve operable by reciprocal movement by the ram for directing the operating liquid to the motor, and a plurality of valves normally held toward their closed positions by the operating liquid pressure and responsive to the pressure of liquid discharged from the cylinder for cushioning the action of said piston.

10. A gear grinder including means for supporting a gear for grinding, means for reciprocating an abrasive wheel for grinding the gears, means for effecting a rolling movement of the gear relative to the grinding wheel, means for indexing the gears incidental to the grinding thereof, and a plurality of hydraulic motors coordinated one with another for effecting operation of said mechanisms.

11. A gear grinder including means for supporting a gear for grinding, means for reciprocating an abrasive wheel for grinding the gears, means for effecting rolling motion of the gear relative to the grinding wheel, means for indexing the gears incidental to the grinding thereof, a plurality of hydraulic motors coordinated one with another for effecting operation of said mechanisms, and means for regulating the operation of said motors.

In testimony whereof, I hereto affix my signature.

ANNA M. GARRISON,
*Administratrix of the Estate of Orlando Garrison, Deceased.*